Nov. 19, 1963　　　　D. H. PHARE　　　　3,111,204
STRUCTURAL ELEMENT AND A METHOD OF MAKING A STRUCTURAL ELEMENT
Filed Aug. 22, 1960　　　　　　　　　　　　　　3 Sheets-Sheet 1

Nov. 19, 1963  D. H. PHARE  3,111,204
STRUCTURAL ELEMENT AND A METHOD OF MAKING A STRUCTURAL ELEMENT
Filed Aug. 22, 1960  3 Sheets-Sheet 3

United States Patent Office 3,111,204
Patented Nov. 19, 1963

3,111,204
STRUCTURAL ELEMENT AND A METHOD OF MAKING A STRUCTURAL ELEMENT
Derek Henry Phare, Gravesend, Kent, England, assignor to British Uralite Limited, Gravesend, Kent, England
Filed Aug. 22, 1960, Ser. No. 51,174
Claims priority, application Great Britain Aug. 24, 1959
5 Claims. (Cl. 189—34)

The present invention relates to a structural element and a method of making a structural element.

The term "structural element" as used in the specification refers to elements which may be used in the forming or building of structures and includes girders, beams, joists and like structures used in forming a span and also double skinned panel elements for use, for example, as roof decking, cladding panels, partitions and the like.

According to the present invention a method of making a structural element comprises the steps of forming in a sheet of material a series of spaced rows of parallel slits, which slits are inclined to the longitudinal axes of their respective rows, and thereby dividing the sheet into slitted portions or strips with intervening unslitted portions or strips, and applying a force to displace alternate unslitted portions to form a substantially castellated shaped structure when viewed in end elevation. The invention includes a structural member so made.

The invention also includes a blank of sheet material for use in making a structural element, which blank has a series of rows of parallel slits, said slits being inclined at an angle to the longitudinal axes of their respective rows, and strips of unslitted portions separating the rows of slits.

The invention further consists in a structural element comprising two parallel and overlying surface parts joined and supported together by a plurality of supporting means some of which are inclined to the said surface parts by angles equal and opposite to the angles by which the other supporting means are inclined to the said surface parts.

The structural element may be made from flexible self-supporting material such as metallic sheet or from thermoplastic synthetic resins or plastics. As an example the metallic sheet may be steel sheet or aluminium sheet of 16–24 gauge.

Examples of structural elements made according to the present invention and methods of making the element are shown in the accompanying drawings, in which.

Figure 1:
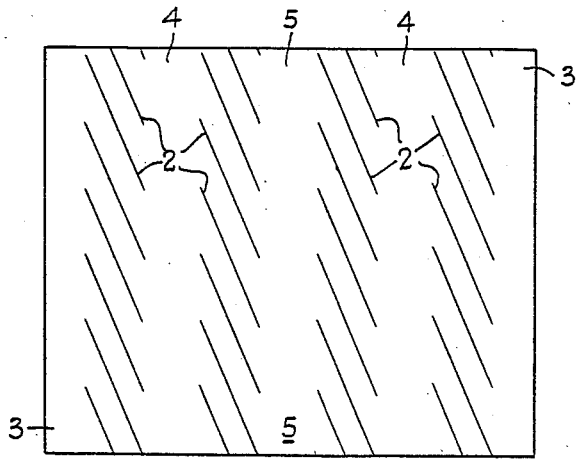
FIGURE 1 is a plan view of a flat sheet with slits in it.
Figure 2:
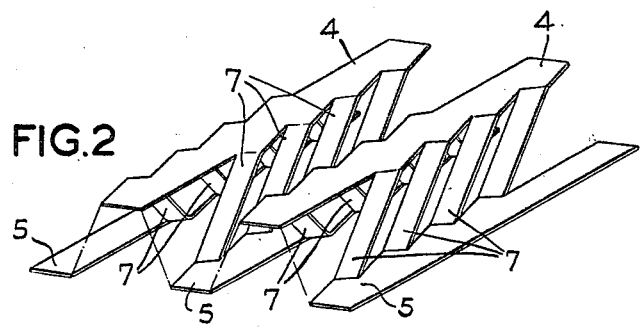
FIGURE 2 is a perspective view of a structural element pressed or formed from the sheet shown in FIGURE 1.
Figure 3:
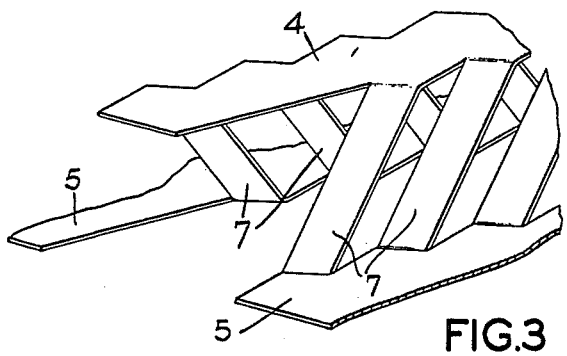
FIGURE 3 is an enlarged detail from FIGURE 2.

FIGURES 1 to 3 show the steps of forming one example of structural element in which a flat sheet of material, conveniently sheet steel, generally designated 3 is formed into a blank by having punched therein a plurality of slits 2, in lateral rows across the sheet. The blank 3 is thus provided with parallel slitted and unslitted portions, successive unslitted portions being herein designated 4 and 5 respectively. All the slits are parallel, of the same length, equally spaced apart from adjacent slits and at an angle to the lateral and longitudinal axes of the sheet and to the rows of slits. Further at least some of the slits of one row of slits lie on extensions of the slits of an adjacent row of slits.

Alternate unslitted portions 4 are maintained in one plane and the remaining unslitted portions 5 have a downward force applied to them, at the same time allowing each successive portion 4, 5 to move relatively forwards, so that as a result of this action a structural element as shown in FIGURES 2 and 3 is formed, the portions between the slits becoming separate ribs 7.

The ribs 7 are in planes at substantially 60° to a horizontal plane between adjacent portions 4, 5 and are also inclined thereto. This angle may be varied within wide limits.

Figure 4:
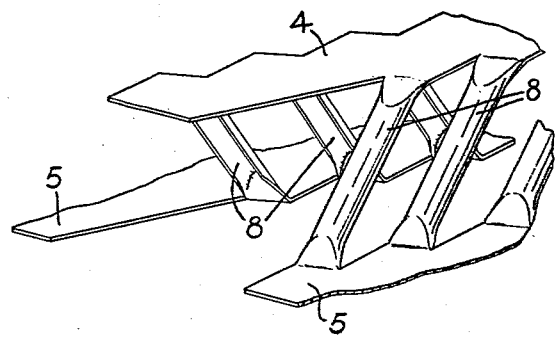
FIGURE 4 is an enlarged detail from FIGURE 2 in which the ribs are bent into arcuate cross section.

If desired the ribs 7 may be "troughed" by stamping during the slit punching stage. The troughs 8, FIGURE 4, give the ribs strength and rigidity.

Figure 5:
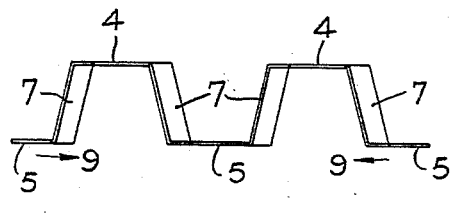
FIGURE 5 is a side elevation of FIGURE 2 showing the direction of movement to make a double skinned element.
Figure 7:
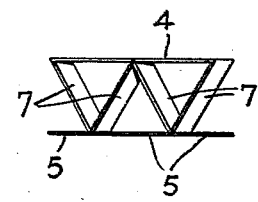
FIGURE 7 is a side elevation of the double skinned element shown in FIGURE 6.
Figure 6:
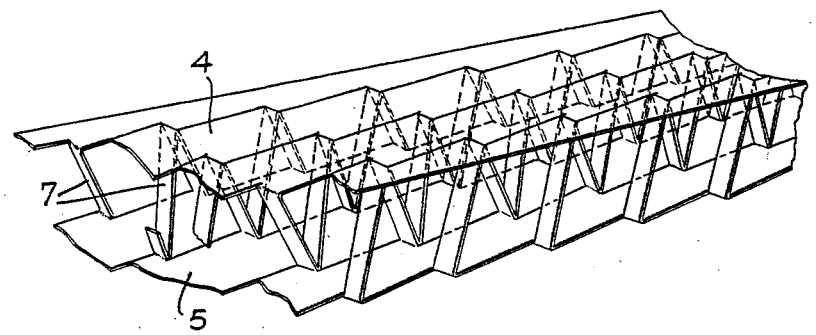
FIGURE 6 is a perspective view of a double skinned structural element.

FIGURES 5 to 7 show how a double skinned structural element may be made from the element shown in FIGURE 2.

If the unslitted portions 4, 5, FIGURE 2, are pulled sequentially, from the left hand side, rearwardly, the angle of the ribs 7 will increase accordingly and at the same time the resolution of forces is such that that unslitted portion to which tension is applied will follow a path of arcuate form of which the ribs are a radius. Thus any given unslitted member will be swung towards its adjacent unslitted member. When the ribs 7 have passed through an angle of 120° adjacent unslitted members will meet, the centre line of any one rib co-inciding substantially exactly with the centre line of a rib from the opposite side of the unslitted portion, and nesting of the unslitted portions takes place. The ribs on one side of an unslitted portion will be inclined at an angle to the unslitted portion which is equal and opposite to the angle at which the ribs on the other side of the said unslitted portion are inclined to that unslitted portion. The zig-zag lines of the joins can be welded or spot welded together to form a strong rigid structure separated by the rows of ribs 7.

It is preferred to make structural elements from sheets of material by shearing the slits and applying the displacing force in successive steps rather than as a continuous process due to the angular deformation of the sheet which takes place.

The double skinned element is particularly useful as a ceiling decking as that surface forming the roof can be simply coated with a weather impervious substance such as bitumen. If desired the intermediate space between the skins can be filled with a heat or sound insulating substance. The use to which the element is to be put will determine the surfacing material used.

Figure 8:
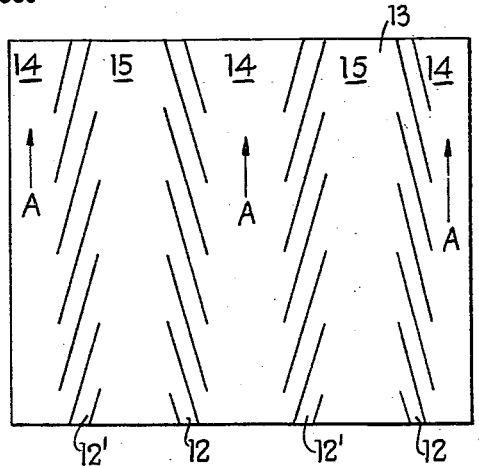
FIGURE 8 is a plan view of an alternative arrangement of slits in a flat sheet.

In the blank 13 shown in FIGURE 8 the direction of the slits alternate between rows, the rows of slits 12 being in the same direction as those of FIGURE 1, but the slits 12′ are opposed thereto (i.e. at an equal but opposite angle to the longitudinal and lateral axes of the rows) forming a basic herringbone configuration with a wide spine, the unslitted portion 15, between the slits.

Figure 10:
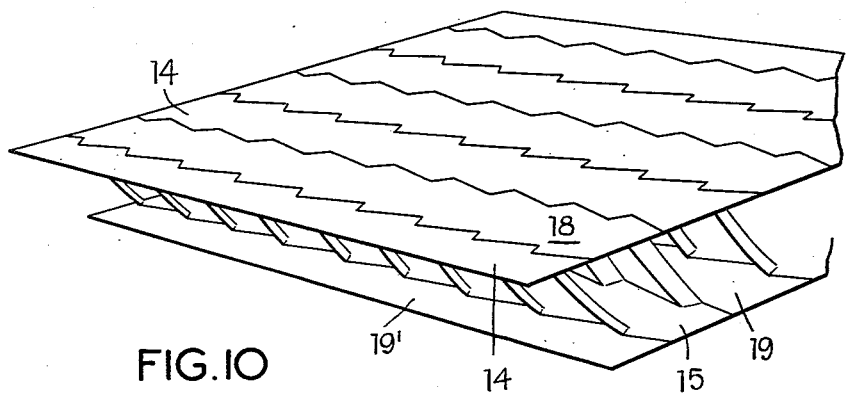
FIGURE 10 is a perspective view of a further double skinned structural element.

Relative motion between the unslitted portions 14 and the portions 15 is then effected by pulling the unslitted portions in the direction of the arrows A whereby a structural element somewhat similar to that shown in FIGURE 2 is obtained, the portions 14 and 15 being in superposed parallel planes. The configuration of the structural element so formed is such that the adjacent unslitted portions 14 or adjacent unslitted portions 15 will not nest as in FIGURE 6 but the angular deformation is more limited than in the example shown in FIGURE 1. A double skinned element can however be made as shown in FIGURE 10 by securing, as by welding "fir tree" shaped sheets 18, 19 of complementary shape to adjoin respectively adjacent unslitted portions 14 and adjacent unslitted portions 15. Half "fir tree" shaped sheets 19' are provided at the sides of end portions 15 to give a straight edge to the element.

The overall height between the skins in the examples is determined by the length of slits punched in the original flat sheet. Likewise the ribs may be of greater or lesser width dependent on the distance between the slits.

Figure 9:
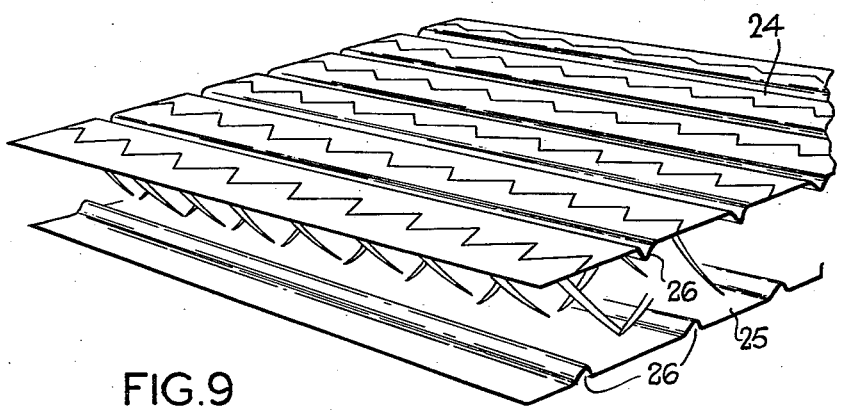
FIGURE 9 is a perspective veiw of a completed double skinned structural element with strengthening ribs.

In the structural element shown in FIGURE 9 which is generally similar to the structural element shown in FIGURE 6, strengthening troughs 26 are pressed into the surfaces 24, 25, the troughs being pressed during the initial punching and rib forming operation.

I claim:

1. A method of making a structural element comprising the steps of forming in a sheet of material parallel rows of similar, aligned, elongated apertures of equal lengths, the apertures of each row being similarly and equally inclined to the longitudinal axis of the row, thereby dividing the sheet into apertured portions and intervening unapertured portions, applying to the unapertured portions force having components both in the plane of and normal to the sheet to displace alternate unapertured portions to positions in which these portions are coplanar and spaced from the remainder of the unapertured portions, and to displace, in each row of apertures, central sections at least of the parts between the apertures to positions in which said central sections present parallel surfaces, placing coplanar with and between pairs of alternate unapertured portions respective sheets each having side edges shaped in a manner complementary with opposed side edges of the associated pair of unapertured portions and securing the sheets to the unapertured portions.

2. A structural element formed in one piece from sheet material, comprising successive unapertured and apertured portions of which alternate unapertured portions are wholly disposed in coplanar form and spaced from the remainder of the unapertured portions whilst the apertured portions are each formed with a row of parallel and aligned elongated apertures of equal lengths and, in each apertured portion, central sections at least of the parts between the apertures present parallel surfaces, and comprising also sheets of material respectively disposed coplanar with and between pairs of alternate unapertured portions and secured thereto, the sheets each having side edges shaped in a manner complementary with opposed side edges of the associated pair of alternate unapertured portions.

3. A method of making a structural element comprising the steps of forming in a sheet of material parallel rows of similar, aligned, elongated apertures of equal lengths, the apertures of all rows being parallel and inclined to the longitudinal axes of the rows, thereby dividing the sheet into apertured portions and intervening unapertured portions, and applying to the unapertured portions force having components both in the plane of and normal to the sheet to displace alternate unapertured portions to positions in which these portions are coplanar and spaced from the remainder of the unapertured portions, and in which corresponding side edges of alternate unapertured portions are in contiguous relationship and to displace, in each row of apertures, central sections at least of the parts between the apertures to positions in which said central sections present parallel surfaces.

4. A method as claimed in claim 3, wherein the said alternate unapertured portions are joined together by welding.

5. A structural element formed in one piece from sheet material, comprising successive unapertured and apertured portions of which alternate unapertured portions are wholly disposed in coplanar form and spaced from the remainder of the unapertured portions with corresponding side edges of alternate unapertured portions in contiguous relationship whilst the apertured portions are each formed with a row of parallel and aligned elongated apertures of equal lengths and, in each apertured portion, central sections at least of the parts between the apertures present parallel surfaces.

References Cited in the file of this patent

UNITED STATES PATENTS

| 689,939 | White | Dec. 31, 1901 |
| 849,502 | Rude | Apr. 9, 1907 |
| 1,296,272 | Doble | Mar. 4, 1919 |
| 1,562,158 | Gersman | Nov. 17, 1925 |
| 1,681,400 | Gersman | Aug. 21, 1928 |
| 2,041,956 | Reid | May 26, 1936 |
| 3,046,638 | Melzer | July 31, 1962 |

FOREIGN PATENTS

| 219,385 | Great Britain | July 23, 1924 |